United States Patent Office
3,751,479
Patented Aug. 7, 1973

3,751,479
OXO-SUBSTITUTED ALIPHATIC HYDROCARBONS
Norman E. Liddell, Gainesville, Fla., and John B. Siddall, Palo Alto, Calif., assignors to Zoecon Corporation, Palo Alto, Calif.
No Drawing. Continuation-in-part of application Ser. No. 61,397, Aug. 4, 1970. This application Oct. 28, 1970, Ser. No. 84,870
Int. Cl. C07c 49/20
U.S. Cl. 260—593 R
10 Claims

ABSTRACT OF THE DISCLOSURE

Novel oxo-substituted aliphatic compounds and intermediates therefor useful for the control of insects.

---

This is a continuation-in-part of application Ser. No. 61,397, filed Aug. 4, 1970.

This invention relates to novel oxo-substituted aliphatic compounds, derivatives thereof and intermediates therefor and the control of insects.

The novel compounds of the present invention and derivatives thereof are represented by the following formula:

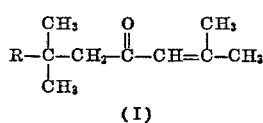

(A)

wherein, $n$ is a positive integer of one to five;
each of R and $R^1$ is lower alkyl;
$R^3$ is oxygen atom or cycloethylenedioxy;
$R^2$ is

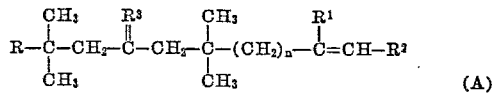

and —$CH_2$—$SR^5$ wherein $R^5$ is hydrogen, alkyl, cycloalkyl, aralkyl or aryl; and
each of $R^6$ and $R^7$ is hydrogen, alkyl, cycloalkyl, phenyl, alkoxyalkyl, hydroxyalkyl, lower alkenyl, or, when taken together with the nitrogen atom to which they are attached, pyrrolidino, morpholino, piperidino, piperazino or 4-lower alkylpiperazino.

The compounds of Formula A including the cycloethylene ketals are useful for the control of insects. The utility of these compounds as insect control agents is believed to be attributable to their juvenile hormone activity. They are preferably applied to the immature insect— namely, during the embryo, larvae or pupae stage in view of their ability to inhibit metamorphosis. The compounds are also effective on adults, acting as a chemosterilant on the female. These compounds are particularly effective control agents for Hemipteran insects and especially for the family Phrrhocoridae, such as *Pyrrhocoris apterus* and members of Dysdercus, such as *Dysdercus intermedius*. The compounds can be applied at very low dosage levels of the order of 0.001 μg. to 5.0 μg. per insect. Suitable carriers substances include liquid or solid carriers, such as water, mineral or vegetable oils, talc, vermiculite, natural and synthetic resins and silica. Treatment of insects in accordance with the present invention is accomplished by spraying, dusting or exposing the insects to the vapor of the compounds of Formula A. Generally, a concentration of less than 25% of the active compound is employed. The formulations can include insect attractants, emulsifying agents or wetting agents to assist in the application and effectiveness of the active ingredient. In the application of the compounds, there is generally employed a mixture of the trans and cis isomers, the trans isomer being the preferred embodiment for the control of insects.

In the description following, each of R, $R^1$, $R^2$ and $n$ is as defined above.

The compounds of Formula A are prepared according to the following outlined general process:

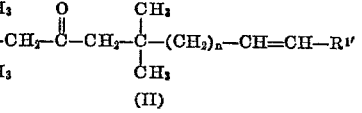

(II)

↓

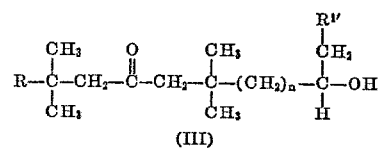

(III)

↓

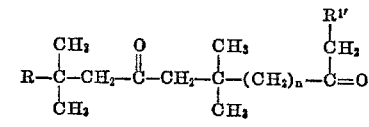

(IV)

↓

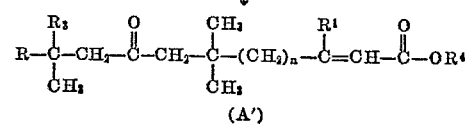

(A′)

In the above formulas, $R^{1\prime}$ is hydrogen or lower alkyl (primary or secondary) of one to five carbon atoms and $R^4$ is alkyl. In the practice of the above novel process, the compounds of Formula I are prepared by the alkylation of phorone using an organo-copper complex prepared from lower alkyl lithium or lower alkyl magnesium halide and cuprous salt, such as cuprous iodide or cuprous acetate. The alkylated phorone (I) is converted into the unsaturated ketone (II) by alkylation using the organocopper complex formed from cuprous salt and Grignard prepared from magnesium and a bromide or chloride of the Formula V:

$$X\text{—}(CH_2)_n\text{—}CH=CH\text{—}R^{1\prime} \qquad (V)$$

in which X is bromo or chloro and $n'$ is two to five, such as 1-bromobut-3-ene, 1-bromopent-4-ene, 1-bromohex-4-ene, and the like, to yield compounds of Formula II in which $n$ is two to five. Alternatively, these compounds can be prepared by alkylation using an organo-copper complex formed from cuprous salt and the appropriate organo lithium. To prepare compounds of Formula II wherein $n$ is one, there is employed the appropriate lithium di-alkenyl cuprate, such as lithium diallyl cuprate.

Preparation of appropriate organo-copper complexes for alkylation is described by House and Fischer, J. Org. Chem. 34, 3615 (1969) and Siddall et al., J. Am. Chem. Soc. 91, 1853 (1969). The unsaturated ketone (II) is then reacted with a mercuric salt, such as mercuric acetate, mercuric chloride, mercuric trifluoroacetate or mercuric nitrate in the presence of water to yield the mercuric salt of III which is then reduced using a reducing agent, such as sodium borohydride, sodium amalgam, hydrazines, and the like, to yield the hydroxyl (III). When $R^{1'}$ is lower alkyl, the reaction results in introduction of the hydroxy group at two positions so as to form the compounds of Formula III' as well as those of Formula III:

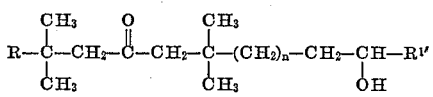

in which $R^{1'}$ is lower alkyl of one to five carbon atoms. The Compounds III and III' are separated by chromatography or fractional distillation. The hydroxyl III (or III') is then oxidized using Jones reagent, manganese dioxide, or other oxidizing agent to yield the di-ketone (IV). The di-ketone (IV) is converted into the $\alpha,\beta$-unsaturated ester (A') by reaction with the carbanion of dialkyl carbalkoxymethylphosphonate or by Wittig reaction. The alkyl esters (A') are converted into the corresponding acid (A'; $R^4$ is hydrogen) by hydrolysis with base, such as potassium carbonate or sodium carbonate in organic solvent, such as methanol or ethanol. Other esters of the present invention can be prepared by transesterification or conversion of the acid into the acid halide by treatment with thionyl chloride, oxalyl chloride, or the like, and then reacting the acid halide with the alcohol corresponding to the ester moiety desired. The cycloethylene ketals of the present invention are prepared by treatment of the ketone ($R^3$ is oxygen atom) with ethylene glycol in organic solvent, such as toluene, in the presence of acid catalyst, such as p-toluenesulfonic acid. Instead of introducing the cycloethylene ketal group after formation of the compound of Formula A', the cycloethylene ketal group can be introduced earlier on the ketone I, II or III using the above procedure. To retain the ketal group on a compound of Formula IV, the oxidation of the hydroxyl (III) should be done using manganese dioxide or similar oxidizing agent to avoid the acid conditions of oxidizing agents, such as Jones reagent, which will completely or partially remove the ketal group.

The compounds of Formula A', in addition to their utility as insect control agents, are useful chemical intermediates, plasticizers for hydrocarbon polymers and lubricants. The intermediates of Formulas I, II, III and IV, in addition to their utility as intermediates for the insect control agents of the present invention, are useful in chemical syntheses in general, such as preparation of perfumery agents and as a component of perfume formulations by reason of their odor characteristics.

The ketones, nitriles and amides of Formula A are prepared by the reaction of a ketone of Formula IV or the ketal thereof with a compound of the formula:

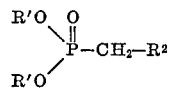

in the presence of base, wherein R' is alkyl, cycloalkyl, aralkyl or aryl and

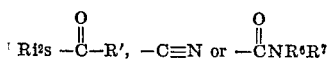

The aldehydes of Formula A can be prepared using the procedure of Nagata et al., J. Chem. Soc. (C), 460 (1969) or by reduction of the ketal of the ester A' to the allylic alcohol and oxidation thereof using manganese dioxide. The ketones can be prepared by treatment of the acid, obtained by hydrolysis of the ester A' or ketal thereof, with organo lithium. The amides can be prepared also by reaction of an acid chloride or bromide with an amine. The ethers are obtained from the C–1 alcohol or C–1 halide, bromide or chloride, using conventional methods. The amines are prepared by reduction of the amides or by reacting an allylic bromide or chloride with the desired amine.

The ketones and aldehydes of Formula A are useful odorants and in preparing perfumery compositions.

The term "alkyl," as used herein, refers to a straight or branched chain saturated aliphatic hydrocarbon group having a chain length of one to eight carbon atoms. The term "lower alkyl," as used herein, refers to a primary or secondary alkyl group having a chain length of one to six carbon atoms. The term "cycloalkyl," as used herein, refers to a cycloalkyl group of four to eight carbon atoms. The term "aralkyl," as used herein, refers to an aralkyl group of seven to twelve carbon atoms, such as benzyl, phenylethyl, methylbenzyl and naphthylmethyl. The term "aryl," as used herein, refers to an aryl group of six to twelve carbon atoms, such as phenyl, methylphenyl, naphthyl, and the like. The term "hydroxyalkyl," as used herein, refers to an alkyl group substituted with one hydroxy group. The term "alkoxyalkyl," as used herein, refers to an alkyl group substituted with one alkoxy group. The term "lower alkenyl," as used herein, refers to an ethylenically unsaturated aliphatic hydrocarbon of up to six carbon atoms.

The following examples are provided to illustrate the preparation of the compounds of the present invention and the practice of the present invention. Temperature in degrees centigrade.

EXAMPLE 1

(A) To a suspension of cuprous iodide (25 g.) in 500 ml. of dry ether at 0° is added 150 ml. of 1.6 M methyl lithium in ether at a moderate rate with stirring under argon. After about 20 minutes at 0°, 14 g. of phorone (di-isopropylidene acetone) in 30 ml. of ether is added slowly and the mixture stirred for about 0.5 hour. The mixture is then poured into rapidly stirred aqueous ammonium chloride (about one liter), allowed to stand and the layers separated. The ether layer is washed with saturated sodium chloride, the water layer is extracted with ether and combined with the ether phase and dried over sodium sulfate and filtered. The filtrate is evaporated in vacuo to yield 2,6,6-trimethylhept-2-en-4-one (methyl phorone).

(B) To 363 mg. of magnesium turnings in 10 ml. of ether is added a few drops of 1-bromopent-4-ene in ether, a small amount of 1,2-dibromoethane and a crystal of iodine. After 15 minutes, additional 1-bromopent-4-ene (total of 1.5 g.) is added slowly (about one hour). After addition is complete, the mixture is stirred two hours. Then 1.149 g. of cuprous iodide is added and cooled immediately to −25° and stirred for 20 minutes. Then 776 mg. of 2,6,6-trimethylhept-2-en-4-one is added at −25° to −30° over five minutes and then stirred for one hour. The reaction mixture is quenched by pouring into aqueous ammonium chloride and then extracted with ether. The ethereal extracts are washed and then dried over sodium sulfate to yield 6,6,10,10-tetramethylundec-1-en-8-one.

EXAMPLE 2

To 3.07 g. of magnesium turnings (washed with dilute HCl and rinsed with ether) is added 50 ml. of ether and a crystal of iodine. A few ml. of 1-bromopent-4-ene in ether is added and stirred for 5 minutes. Then remainder of 1-bromopent-4-ene is added slowly (total of 15.22 g. in 40 ml. of ether) and stirred 2.5 hours after addition at reflux. Cuprous iodide (10.52 g.) at −20° is added maintaining temperature at −25° to −30°. Additional cuprous iodide (9.62 g.) and 20 ml. of ether is added and then stirred 30 minutes and added 40 ml. of ether. Stirred an additional 30 minutes and then added 8.00 g. of 2,6,6-trimethylhept-2-en-4-one in 20 ml. of ether over 15 minutes. Stirred for 45 minutes and then quenched by pouring into rapidly stirred aqueous ammonium chloride. The mixture is then filtered and the filtrate dried over sodium sulfate and magnesium sulfate and then evaporated to yield crude 6,6,10,10-tetramethylundec-1-en-8-one which is purified by fractional vacuum distillation.

EXAMPLE 3

To 3.157 g. of mercuric acetate in 10 ml. of water is added 10 ml. of tetrahydrofuran followed by 2.248 g. of 6,6,10,10-tetramethylundec-1-en-8-one in a few ml. of tetrahydrofuran. The mixture is stirred 13 minutes and then added 10 ml. of 10% sodium hydroxide (1:10) followed by 10 ml. of a solution of 400 mg. of sodium borohydride in 10 ml. of 10% sodium hydroxide. After addition complete mixture stirred 5 minutes and allowed to stand several hours at 5°. The layers are separated and ether backwash of water layer combined with organic layer. The organic phase is dried over magnesium sulfate and evaporated to yield 6,6,10,10 - tetramethyl - 8- oxoundecan—2-ol which can be purified by fractional distillation.

EXAMPLE 4

To a mixture of 8.00 g. of 6,6,10,10-tetramethyl-8-oxoundecan-2-ol in 300 ml. of acetone is added about 7.5 ml. of Jones reagent (8N) slowly with stirring. After about 1.5 hours the mixture is poured in saturated sodium chloride and extracted with ether. The ether extracts are dried over sodium sulfate and evaporated in vacuo to yield 6,6,10,10-tetramethylundeca-2,8-dione.

EXAMPLE 5

To 1.292 g. of sodium hydride (57% in oil) previously washed with pentane, under nitrogen is added 50 ml. of dry tetrahydrofuran and then, after cooling to 0°, is added 7.167 g. of triethyl phosphonoacetate dropwise. The mixture is then stirred for 30 minutes and then added dropwise over about 1 hr. to 6.73 g. of 6,6,10,10-tetramethylundeca-2,8-dione at room temperature with stirring. The solution is stirred overnight.

Additional phosphonoacetate anion solution is prepared as before from 25 ml. of tetrahydrofuran, 1.804 g. of triethylphosphonoacetate and 0.322 g. of sodium hydride (57% in oil). This is added over one hour to the above reaction mixture and then the total mixture stirred for 20.5 hours. The mixture is poured into 300 ml. of saturated sodium chloride at 0°. The layers are separated and the organic phase with ether backwash of brine layer, is dried over magnesium sulfate and evaporated to yield cis and trans ethyl 9-oxo-3,7,7,11,11-pentamethyldodec-2-enoate (predominantly trans) which is purified and separated by thin layer chromatography followed by distillation.

EXAMPLE 6

To a suspension of 11.42 g. of cuprous iodide in 150 ml. of ether is added, over 5 minutes, 42 ml. of methylmagnesium bromide (2.95 M) under argon and cooled to 0°. The mixture is stirred for 20 minutes and then 13.82 g. of phorone in 20 ml. of ether is added dropwise. Additional methylmagnesium bromide (60 ml.) is added and mixture stirred for 30 minutes. The mixture is then poured slowly into cold aqueous ammonium chloride (500 ml.) with stirring. The layers are separated, water layer extracted with ether, and the ether extract combined with ether layer. The ethereal phase is washed with aqueous ammonium chloride dilute ammonium hydroxide, water and dried over sodium sulfate, filtered and evaporated in vacuo to yield 2,6,6-trimethylhept-2-en-4-one.

EXAMPLE 7

To a mixture of 72.65 g. of mercuric acetate, 220 ml. of water and 220 ml. of tetrahydrofuran is added 49.88 g. of 6,6,10,10-tetramethylundec-1-en-8-one slowly with stirring over about 10 minutes. The reaction mixture is stirred for one hour and then, with cooling in ice-bath, 220 ml. of 3 N sodium hydroxide is added followed by addition of 220 ml. of 3 N sodium hydroxide containing 4.2 g. of sodium borohydride (0.5 N) over 10 minutes. The reaction mixture is stirred for 1.5 hours at 0°. Sodium chloride is added and stirred for 10 minutes. The layers are separated and the organic layer combined with ether extract of water layer. The organic phase is dried over calcium sulfate/magnesium sulfate and evaporated to yield 2-hydroxy - 6,6,10,10 - tetramethylundecan-8-one.

EXAMPLE 8

To a suspension of 95.7 g. of cuprous iodide in 500 ml. of dry ether is added 700 ml. of methylmagnesium bromide (1.5 M) at 0° over 20 minutes under argon and stirred for 30 minutes. Then 115.8 g. of phorone in 100 ml. of ether is added over 45 minutes and mixture stirred 30 minutes and let stand for 1.5 hours. The mixture is poured slowly into a solution of 167.5 g. of ammonium chloride in 1500 ml. of water at 0° with rapid stirring. The layers are separated and ether backwash of water layer combined with ether layer. The ether phase is washed with dilute ammonium hydroxide, dried over sodium sulfate, filtered and evaporated in vacuo to yield 2,6,6-trimethylhept-2-en-4-one.

EXAMPLE 9

To 366 mg. of magnesium turnings in 10 ml. of dry ether is added a few drops of a solution of 1.49 g. of 1-bromopent-4-ene in 5 ml. of dry ether and a few drops of 1,2-dibromoethane. The mixture is stirred for two hours and then remainder of 1-bromopent-4-ene solution is added slowly and stirred for 5 hours. Cuprous iodide (1.143 g.) is added with stirring (temp. —20° to —10°) and stirring continued one hour. Solution of 1.038 g. of phorone in 5 ml. of ether is added slowly and stirred at —20° for one hour. The reaction is quenched by pouring into aqueous ammonium chloride and then extracted with ether. The ethereal extract is dried over sodium sulfate and evaporated in vacuo to yield 6,6,10,10-trimethylundeca-1,9-dien-8-one.

EXAMPLE 10

To lithium wire (3.2 cm. long, 0.32 cm. diameter) in 15 ml. of dry ether is added 1.5 g. of 1-bromo-4-pentene in 5 ml of dry ether over 30 minutes at —20°. Stirred for 30 minutes and then add 1.15 g. of cuprous iodide at —25°, cooled to —50° and allowed to warm to —40°. After about 15 minutes, 1.04 g. of phorone is added over 10 minutes at —40° to —35°. The reaction mixture is stirred 20 minutes, stored overnight at —10° and then stirred 4 hours at —10°. The mixture is poured into aqueous ammonium chloride and extracted with ether. The organic phase is dried over sodium sulfate and evaporated to yield 6,6,10-trimethylundec-1,9-dien-8-one which is purified by chromatography.

EXAMPLE 11

To a solution of 4.6 ml. of methyllithium (1.65 M in ether) in 10 ml. of dry ether, cooled to —10°, under argon, is added 882 mg. of cuprous iodide and the mixture stirred for 0.5 hour. Then 1.48 g. of 6,6,10-trimethylundec-1,9-dien-8-one in 5 ml. of ether is added over 10 minutes at —10° and then stirred 5.5 hours at —15° to 0° and stored overnight at —10°. The mixture is poured into aqueous ammonium chloride and extracted with ether. The organic phase is dried over sodium sulfate and evaporated in vacuo to yield 6,6,10,10-tetramethylundec-1-en-8-one which is purified by chromatography.

EXAMPLE 12

To a mixture of 998 mg. of 6,6,10,10-tetramethyl-8-oxoundecan-2-ol in 20 ml. of acetone is added about 1.2 ml. of 8 N Jones reagent slowly and the stirred for about 1.5 hours. The mixture is then poured into water (100 ml.) and extruded with ether. The ethereal extracts are dried over magnesium sulfate and evaporated in vacuo to yield 6,6,10,10-tetramethylundeca-2,8-dione.

EXAMPLE 13

The process of Example 5 is repeated using each of diethyl carbomethoxy methylphosphonate, diethyl carbo (n-propoxy) methylphosphonate and dimethyl carbobutoxymethylphosphonate in place of diethyl carbethoxymethylphosphonate to yield methyl 3,7,7,11,11-pentamethyl-9-oxododec-2-enoate, n-propyl 3,7,7,11,11-pentamethyl-9-oxododec-2-enoate and n-butyl 3,7,7,11,11-pentamethyl-9-oxododec-2-enoate, respectively.

EXAMPLE 14

(A) The process of Example 1(A) is repeated using each of ethyl lithium, n-propyl lithium and i-propyl lithium in place of methyl lithium to yield 2,6,6-trimethyloct-2-en-4-one, 2,6,6-trimethylnon-2-en-4-one and 2,6,6,7-tetramethyloct-2-en-4-one, respectively. Alternatively, the process of Example 6 can be used by employing the ethyl Grignard, n-propyl Grignard and i-propyl Grignard.

(B) Each of the ketones of part A of this example is used in the process of Example 1(B) in place of 2,6,6-trimethylhept-2-en-4-one to yield 6,6,10,10-tetramethyldodec-1-en-8-one, 6,6,10,10-tetramethyltridec-1-en-8-one and 6,6,10,10,11-pentamethyldodec-1-en-8-one, respectively.

(C) The thus-obtained 8-oxo-1-ene compounds are treated with mercuric acetate followed by sodium borohydride following the process of Example 3 to yield 6,6,10,10-tetramethyl-8-oxododecan-2-ol, 6,6,10,10-tetramethyl-8-oxotridecan-2-ol and 6,6,10,10,11-pentamethyl-8-oxododecan-2-ol, respectively.

(D) The 2-hydroxyls of part C of this example are oxidized following the procedure of Example 4 to yield 6,6,10,10-tetramethyldodeca-2,8-dione, 6,6,10,10-tetramethyltrideca-2,8-dione and 6,6,10,10,11-pentamethyldodeca-2,8-dione, respectively.

(E) Each of the 2,8-diketones of part D of this example is reacted with the anion of diethyl carbethoxymethylphosphonate following the procedure of Example 5 to yield ethyl 9-oxo-3,7,7,11,11-pentamethyltridec2-enoate, ethyl 9-oxo-3,7,7,11,11-pentamethyltetradec-2-enoate, and ethyl 9-oxo-3,7,7,11,11,12-hexamethyltridec-2-enoate, respectively.

Similarly, by using diethyl carbomethoxymethylphosphonate, the corresponding methyl esters are prepared.

EXAMPLE 15

(A) The process of Example 1(B) is repeated using each of 1-bromohex-5-ene, 1-bromohept-4-ene and 1-bromohex-4-ene in place of 1-bromopent-4-ene to yield 7,7,11,11-tetramethyldodec-1-en-9-one, 8,8,12,12-tetramethyltridec-3-en-10-one, and 7,7,11,11-tetramethyldodec-2-en-9-one, respectively.

(B) Each of the unsaturated ketones of part A of this example is oxidized and then reduced using the process of Example 3 to yield 7,7,11,11-tetramethyl-9-oxododecan-2-ol, a mixture of 8,8,12,12-tetramethyl-10-oxotridecan-3-ol and 8,8,12,12-tetramethyl-10-oxotridecan-4-ol (separated by chromatography) and a mixture of 7,7,11,11-tetramethyl-9-oxododecan-2-ol and 7,7,11,11-tetramethyl-9-oxododecan-3-ol (separated by chromatography), respectively.

(C) The alcohols of part B of this example are oxidized using the procedure of Example 4 to yield the corresponding diketones, namely, 7,7,11,11-tetramethyldodeca-2,9-dione, 8,8,12,12-tetramethyltrideca-3,10-dione, 8,8,12,12-tetramethyltrideca - 4,10-dione, 7,7,11,11-tetramethyldodeca-2,9-dione and 7,7,11,11-tetramethyldodeca-3,9-dione, respectively.

(D) Following the procedure of Example 5, each of the diketones of part C is converted into the corresponding unsaturated ethyl ester, namely ethyl 10-oxo-3,8,8,12,12-pentamethyltridec-2-enoate, ethyl 10-oxo-3-ethyl-8,8,12,12-tetramethyltridec-2-enoate, ethyl 9-oxo-3-(n-propyl)-7,7,11,11-tetramethyldodec-2-enoate, ethyl 10-oxo-3,8,8,12,12-pentamethyltridec-2-enoate, and ethyl 9-oxo-3-ethyl-7,7,11,11 - tetramethyldodec-2-enoate, respectively.

EXAMPLE 16

Using the procedure of Example 1(B), the organocopper reagent of the Grignard of 1-bromohex-5-ene is reacted with 2,6,6-trimethyloct-2-en-4-one to yield 7,7,11,11-tetramethyltridec-1-en-9-one which is converted into 9-oxo-7,7,11,11-tetramethyltridecan-2-ol and then 7,7,11,11-tetramethyltrideca-2,9-dione using the procedures of Examples 3 and 4. Following the procedures of Example 5, ethyl 10-oxo-3,8,8,12,12-pentamethyltetradec-2-enoate is obtained from the 2,9-dione.

EXAMPLE 17

A mixture of 1 g. of methyl 3,7,7,11,11-pentamethyl-9-oxododec-2-enoate, 60 ml. of methanol, 0.2 g. of sodium carbonate and 6 ml. of water is stirred at about 30° for three hours. The mixture is diluted with water, neutralized and extracted with ether. The ethereal phase is washed with water, dried over sodium sulfate and evaporated to yield 3,7,7,11,11-pentamethyl-9-oxododec-2-enoic acid.

Using the foregoing procedure, the esters of the present invention are hydrolyzed to the corresponding free acid.

EXAMPLE 18

One gram of thionyl chloride is added with stirring at room temperature to 0.5 g. of 3,7,7,11,11-pentamethyl-9-oxododec-2-enoic acid and the mixture heated at about 50° for 10 minutes. Excess thionyl chloride is removed by evaporation and then t-butyl alcohol (about 2 equivalents) is added and the mixture heated at about 50° for five minutes. Excess t-butyl alcohol is removed by evaporation to yield t-butyl 3,7,7,11,11-pentamethyl-9-oxododec-2-enoate which is purified by chromatography.

Similarly, by using other alcohols, such as cyclohexyl alcohol, benzyl alcohol, n-pentanol or i-propanol in the foregoing procedure, the corresponding esters are obtained.

EXAMPLE 19

To a solution of 0.5 g. of 3,7,7,11,11-pentamethyl-9-oxododec-2-enoic acid in 15 ml. of benzene is added with stirring an equivalent amount of potassium carbonate. The mixture is stirred until the evolution of carbon dioxide ceases and then evaporated to yield potassium 3,7,7,11,11-pentamethyl-9-oxododec-2-enoate.

Alternatively, acid salts can be prepared by titrating the acid with an organic solution of the desired base.

EXAMPLE 20

A mixture of 5 g. of ethyl 3,7,7,11,11-pentamethyl-9-oxododec-2-enoate, 1.5 equivalents of ethylene glycol and 250 mg. of p-toluenesulfonic acid monohydrate in 200 ml. of toluene is refluxed for eight hours under Dean-Stark apparatus with continuous removal of water. The mixture is then cooled, neutralized by addition of sodium carbonate, dried over magnesium sulfate and evaporated under reduced pressure to yield ethyl 3,7,7,11,11-pentamethyl - 9,9-cycloethylenedioxydodec-2-enoate which is purified by chromatography.

By use of the foregoing procedure, each of the oxosubstuited esters of the present invention is converted into the correspondisg cycloethylene ketal.

Using the foregoing procedure, each of the mono-ketones of Formulas I, II and III is converted into the corresponding ethylene ketal. For example, using each of 2,6,6,-trimethylhept - 2 - en - 4 - one, 2,6,6-trimethyloct-2-en-4-one, 6,6,10,10-tetramethylundec-1-en-8-one and 6, 6,10,10 - tetramethyl - 8 - oxoundecan-2-ol as the starting material affords 2,6,6 - trimethyl - 4,4 - cycloethylenedioxyhept - 2 - ene, 2,6,6 - trimethyl - 4,4 - cycloethylenedioxyoct - 2 - ene, 6,6,10,10 - tetramethyl - 8,8 - cycloethylenedioxyundec - 1 - ene and 6,6,10,10 - tetramethyl-8,8 - cycloethylenedioxyundecan - 2 - ol, respectively.

To each of 10 Pyrrhocoric larvae, 5th instar, is applied 0.01 μg. of ethyl 9 - oxo - 3,7,7,11,11-pentamethyldodec-2-enoate (predominantly trans isomer) in acetone. A second group of 10 larvae is treated with equal amount of acetone only as a control. The control group developed normally. Each of the larvae treated with the ester of the present invention developed abnormally and died without reproducing. Twenty *Pyrrhocoric apterus* eggs treated with 0.05 μg. of the same compound as above failed to hatch into larvae.

EXAMPLE 21

A mixture of 2 g. of 6,6,10,10-tetramethyl-8,8-cycloethylenedioxyundecan-2-ol, 10 g. of manganese dioxide and 30 ml. of methylene chloride is prepared by the slow addition of manganese dioxide so that the temperature does not exceed about 30°. The mixture is then shaken for about 40 hours in an atmosphere of nitrogen at room temperature. The mixture is then filtered and the solid washed with ether. The filtrate and washings are combined and evaporated under reduced pressure to yield 6,6,10,10 - tetramethyl - 8,8 - cycloethylenedioxyundecan-2-one which can be purified by chromatography.

EXAMPLE 22

2,6,6 - trimethylhept - 2 - en-4-one is alkylated using lithium diallyl cuprate following the procedure of Example 1(A) to yield 4,4,8,8-tetramethylnon-1-en-6-one which is used as the starting material in the process of Example 3 to yield 4,4,8,8-tetramethyl-6-oxononan-2-ol which is oxidized using Jones reagent to yield 4,4,8,8-tetramethylnona-2,6-dione. The 2,6 - dione is converted into ethyl 3,5,5,9,9 - pentamethyl - 7 - oxodec-2-enoate using the procedure of Example 5. Similarly, starting with 2,6,6-trimethyloct-2-en-4-one, there is obtained as the final product ethyl 3,5,5,9,9-pentamethyl-7-oxoundec-2-enaote using the foregoing sequence of reactions.

Jones reagent, as used herein, is prepared by mixing 66.7 g. of chromium trioxide and 53 ml. of concentrated sulfuric acid and then diluting with water up to a total volume of 250 ml.

EXAMPLE 23

Three grams of 3,7,7,11,11-pentamethyl-9-oxododec-2-enyl chloride in benzene is added to 2.5 g. of diethylamine in benzene and the resulting mixture allowed to stand at room temperature for about two hours. The mixture is concentrated under reduced pressure and the residue taken up in benzene, washed with dilute aqueous sodium bicarbonate and water, dried over sodium sulfate and evaporated to yield N,N-diethyl 3,7,7,11,11-pentamethyl-9-oxododec-2-enamide.

EXAMPLE 24

Two grams of 3,7,7,11,11 - pentamethyl - 9 - oxotridec-2-enoyl chloride is added to a solution of 4-ethylpiperazine (2 g.) and tetrahydrofuran (20 ml.). The mixture is allowed to stand for four hours at 0°, then 50 ml. of benzene is added and the resulting mixture washed with water, dried over sodium sulfate and evaporated to yield N-(4'-ethylpiperazino)3,7,7,11,11-pentamethyl - 9 - oxotridec-2-enamide.

EXAMPLE 25

Two grams of 3,7,7,11,11-pentamethyl-9-oxotridec-2-enoyl chloride is added to 50 ml. of benzene, cooled to 0° and saturated with ammonia under nitrogen. The mixture is allowed to stand for about one hour and then it is washed with water, dried over sodium sulfate and evaporated to yield 3,7,7,11,11-pentamethyl-9-oxotridec-2-enamide.

EXAMPLE 26

The procedure of Example 23 is repeated with the exception of replacing diethylamine with dimethylamine, ethylamine, pyrrolidine, piperidine, morpholine and 2-methoxyethylamine to yield N,N-dimethyl 3,7,7,11,11-pentamethyl-9-oxododec-2-enamide,
N-ethyl 3,7,7,11,11-pentamethyl-9-oxododec-2-enamide,
N,N-pyrrolidino 3,7,7,11,11-pentamethyl-9-oxododec-2-enamide,
N,N-piperidino 3,7,7,11,11-pentamethyl-9-oxododec-2-enamide,
N,N-morpholino 3,7,7,11,11-pentamethyl-9-oxododec-2-enamide and
N-(2'-methoxyethyl) 3,7,7,11,11-pentamethyl-9-oxododec-2-enamide, respectively.

Similarly, other acid chlorides prepared from the esters of Formula A' are converted into the corresponding amides.

EXAMPLE 27

Sodium hydride (1.7 g., 57% in oil) is washed three times with dry hexane. The hexane is removed and 15 ml. of dry tetrahydrofuran is added. N,N-diethyl diethoxyphosphonoacetamide (0.9 g.) dissolved in 5 ml. of dry tetrahydrofuran is added and stirred for about 40 minutes. Then 6,6,10,10-tetramethyldodeca-2,8-dione (0.8 g.) in 5 ml. of dry tetrahydrofuran is added with stirring and cooling with an ice-bath. The ice-bath is removed after addition is completed and stirring continued for about two hours. Then the mixture is poured into water and extracted with ether. The ether extracts are combined, washed with water, dried over magnesium sulfate and evaporated under reduced pressure to yield cis/trans N,N-diethyl 3,7,7,11,11 - pentamethyl-9-oxotridec-2-enamide.

The foregoing process is repeated using the ketones under Column I as the starting material to yield the respective amides under Column II.

(I)

6,6,10,10-tetramethylundeca-2,8-dione,
6,6,10,10-tetramethyltrideca-2,8-dione,
7,7,11,11-tetramethyldodeca-2,9-dione,
4,4,8,8-tetramethylnona-2,6-dione.

(II)

N,N-diethyl 3,7,7,11,11-pentamethyl-9-oxododec-2-enamide,
N,N-diethyl 3,7,7,11,11-pentamethyl-9-oxotetradec-2-enamide,
N,N-diethyl 3,8,8,12,12-pentamethyl-10-oxotridec-2-enamide,
N,N-diethyl 3,5,5,9,9-pentamethyl-7-oxodec-2-enamide.

EXAMPLE 28

To sodium hydride (0.7 g.), previously washed with hexane, under nitrogen, is added 75 ml. of dry tetrahydrofuran and then, after cooling to 0°, 5.1 g. of diethyl phosphonoacetonitrile is added slowly. The mixture is stirred for about 30 minutes and then added slowly to 6.8 g. of 6,6,10,10-tetramethyldodeca-2,8-dione at room temperature with stirring. The mixture is stirred for about 12 hours and then poured into saturated sodium chloride at 0°. The layers are separated and the organic layer dried over magnesium sulfate and evaporated to yield cis/trans 3,7,7,11,11-pentamethyl-9-oxotridec-2-enenitrile.

By use of the foregoing procedure, each of the ketones of Column I is converted into the corresponding nitrile under Column III.

(III)

3,7,7,11,11-pentamethyl-9-oxododec-2-enenitrile,
3,7,7,11,11-pentamethyl-9-oxotetradec-2-enenitrile,
3,8,8,12,12-pentamethyl-10-oxotridec-2-enenitrile,
3,5,5,9,9-pentamethyl-7-oxodec-2-enenitrile.

EXAMPLE 29

To 130 mg. of a 57% dispersion of sodium hydride in oil is added pentane. The pentane is removed and sodium hydride washed several times with pentane. To the washed sodium hydride is added 590 mg. of diethyl acetylmethylphosphonate in 5 ml. of dry tetrahydrofuran at −10° under argon. After several minutes, the solution is transferred to a solution of 550 mg. of 6,6,10,10-tetramethyl-dodeca-2,8-dione in about 4 ml. of dry tetrahydrofuran under argon over a period of about 20 minutes at room temperature. After about two hours, water is added followed by addition of ether and the layers separated. The organic layer is washed with saturated sodium chloride, dried over sodium sulfate and evaporated under reduced pressure to yield 4,8,8,12,12-pentamethyltetradec-3-ene-2,10-dione.

Using the above procedure, other methyl ketones of Formula A are prepared by the reaction of a ketone of Formula IV with the anion of diethyl acetylmethylphosphonate. For example, each of the ketones of Column I is converted into 4,8,8,12,12 - pentamethyltridec-3-ene-2,10-dione, 4,8,8,12,12 - pentamethylpentadec-3-ene-2,10-dione, 4,9,9,13,13 - pentamethyltetradec-3-ene-2,11-dione and 4,6,6,10,10-pentamethylundec-3-ene-2,8-dione, respectively.

EXAMPLE 30

To a stirred solution of 2.5 g. of 3,7,7,11,11-pentamethyl - 9,9-ethylenedioxytridec-2-enoic acid in 30 ml. of dry ether is added slowly, at 0°, 25 ml. of a one molar solution of ethyl lithium in ether. After about three hours at 20°, the mixture is poured into iced 1 N hydrochloric acid (about 100 ml.) with vigorous stirring. The ether layer is separated, combined with ethereal washings of the aqueous phase, washed with water, saturated potassium bicarbonate and then saturated brine, dried over magnesium sulfate and concentrated under reduced pressure to yield 5,9,9,13,13 - pentamethylpentadec-4-ene-3,11-dione which can be purified by vacuum distillation or chromatography.

By using methyl lithium, n-propyl lithium, t-butyl lithium, n-butyl lithium, phenyl lithium, benzyl lithium and cyclopentyl lithium in the foregoing process, there is obtained the corresponding methyl ketone, n-propyl ketone, t-butyl ketone, n-butyl ketone, phenyl ketone, benzyl ketone and cyclopentyl ketone of Formula A.

Similarly, other acids prepared by the hydrolysis of esters of Formula A' are converted into the ketones of Formula A.

EXAMPLE 31

(A) A solution of 2 g. of methyl 3,7,7,11,11-pentamethyl-9,9-cycloethylenedioxytridec-2-enoate in 20 ml. of dry ether is added with stirring to 0.4 g. of lithium aluminum hydride covered with ether at 0°. After about 1.5 hours, 2.5 ml. of acetic acid is added. The mixture is washed with ice water and the ether phase dried and evaporated under reduced pressure to yield 3,7,7,11,11-pentamethyl-9,9-cycloethylenedioxytridec-2-en-1-ol.

(B) A mixture of 2 g. of the C–1 alcohol of Part A, 10 g. of manganese dioxide and 30 ml. of methylene chloride is prepared by the slow addition of manganese dioxide so that the temperature does not exceed about 30°. The mixture is then shaken for four hours, under nitrogen, at room temperature. The mixture is then filtered and the solid washed with ether. The filtrate and washings are combined and evaporated under reduced pressure to yield the aldehyde, 3,7,7,11,11-pentamethyl-9, 9-cycloethylenedioxytridec-2-en-1-al which can be purified by distillation or chromatography.

EXAMPLE 32

To one gram of 3,7,7,11,11-pentamethyl-9,9-cycloethylenedioxytridec-2-en-1-ol in 20 ml. of tetrahydrofuran is added 2 to 5 ml. of water and 0.1 g. of p-toluenesulfonic acid. The mixture is left at room temperature overnight. The mixture is then worked up by addition of saturated sodium chloride and extraction with ether to yield 3,7,7, 11,11-pentamethyl-9-oxotridec-2-en-1-ol which is oxidized according to the procedure of Example 31 (B) to the C–1 aldehyde.

EXAMPLE 33

Each of 6,6,10,10-tetramethyldodeca - 2,8 - dione and 6,6,10,10-tetramethylundeca-2,8-dione is reacted with the anion of diethyl β-(cyclohexylamino)ethyl phosphonate generated by sodium hydride followed by hydrolysis of the resulting α,β-unsaturated aldimine following the procedure of Nagata et al., Tetrahedron Letters, No. 41, 4359–4362 (1968) and J. Chem. Soc. (C), 460 (1969) to yield 3,7,7,11,11 - pentamethyl-9-oxotridec-2-en-1-al and 3,7,7, 11,11-pentamethyl - 3 - oxododec-2-en-1-al, respectively. Similarly, other compounds of Formula IV can be converted into the corresponding α,β-unsaturated aldehyde.

What is claimed is:

1. A compound selected from those of the following formula:

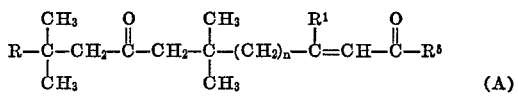

(A)

wherein, $n$ is a positive integer of one to five;

each of R and $R^1$ is lower alkyl; and $R^5$ is hydrogen or lower alkyl.

2. A compound according to claim 1 in which $n$ is three.

3. A compound according to claim 1 in which $n$ is three and each of R and $R^1$ is lower alkyl of one to three carbon atoms.

4. A compound according to claim 3 in which $R^1$ is methyl and R is methyl or ethyl.

5. The trans/cis isomeric mixture of a compound according to claim 4.

6. A compound according to claim 4 wherein $R^5$ is lower alkyl.

7. A compound according to claim 6 wherein $R^5$ is methyl or ethyl.

8. A compound according to claim 4 wherein $R^5$ is hydrogen.

9. A compound according to claim 1 wherein $n$ is two, three or four; R is methyl or ethyl; and $R^1$ is methyl.

10. The compound, 4,8,8,12,12-pentamethyltetradec-3-ene-2,10-dione, according to claim 1.

References Cited

UNITED STATES PATENTS 3,248,428  12/1961  Porter et al. _____ 260—582 X
3,551,463  12/1970  Cywinski _____ 260—586 X ALEX MAZEL, Primary Examiner J. H. TURNIPSEED, Assistant Examiner U.S. Cl. X.R.

260—247.7 K, 268 MK, 294.7, 326.5 J, 340.9, 465.9, 561 K, 562 K, 563 R, 577, 584 A, 584 C, 586 R; 424—331